US005133982A

United States Patent [19]

Bodkin et al.

[11] Patent Number: 5,133,982

[45] Date of Patent: Jul. 28, 1992

[54] METHOD AND APPARATUS FOR CONDITIONING A GRAIN FLOW

[75] Inventors: James D. Bodkin; Kerry L. Struve, both of Hereford, Tex.

[73] Assignee: Panhandle Fluid Process, Inc., Hereford, Tex.

[21] Appl. No.: 766,415

[22] Filed: Sep. 25, 1991

[51] Int. Cl.[5] .............. A23N 17/00

[52] U.S. Cl. .............. 426/231; 99/487; 99/516; 99/536; 426/507

[58] Field of Search .............. 99/485–487, 99/489, 516, 534, 536, 468, 471, 473, 483; 134/132; 364/502, 468, 469, 473, 148, 173; 366/76, 156, 168, 172; 426/231, 507, 506, 511, 454, 455

[56] References Cited

U.S. PATENT DOCUMENTS

| | | | |
|---|---|---|---|
| 3,703,861 | 11/1972 | Slack et al. | 99/471 |
| 3,717,086 | 2/1973 | Hough | 99/471 |
| 3,932,736 | 1/1976 | Zarow et al. | 99/487 |
| 4,055,673 | 10/1977 | Mueller et al. | 426/231 |
| 4,499,111 | 2/1985 | Oetiker et al. | 426/231 |
| 4,721,448 | 1/1988 | Irish et al. | 99/487 |
| 4,742,463 | 5/1988 | Volk, Jr. | 426/454 |
| 4,898,092 | 2/1990 | Greer | 99/516 |
| 4,954,178 | 9/1990 | Caton | 426/454 |
| 4,993,316 | 2/1991 | Greer | 99/536 |
| 5,002,788 | 3/1991 | Satake | 426/507 |

*Primary Examiner*—Timothy F. Simone
*Attorney, Agent, or Firm*—Wendell Coffee; Tracy W. Druce

[57] ABSTRACT

Method and apparatus that automatically monitors the level of moisture absorbed in and adsorbed on the grain flow after the addition of a liquid conditioner. A moisture sensor is located downstream from a liquid applicator head and is capable of accurately measuring the total moisture absorbed in and adsorbed on the grain flow while said grain flow is freshly wetted. By monitoring the moisture level of the grain after the wetting process, the actual level of moisture present in the grain that has been imparted by liquid application is detectable. Therefore, the moisture detection serves as a check on the wetting process and provides adjustment capabilities rendering the conditioning process and resulting moisture contents of the grain flow more accurate than if the moisture content of the grain is detected prior to application of the liquid. A more expedient method and structure by which said method is practiced has been invented that includes a sampling by pass in which a portion of the wetted grain is diverted for more accurate and rapid moisture content detection.

17 Claims, 2 Drawing Sheets

METHOD AND APPARATUS FOR CONDITIONING A GRAIN FLOW

BACKGROUND OF THE INVENTION (1) Field of the Invention

This invention relates generally to methods and apparatus for conditioning materials by adding liquid thereto. More specifically this invention relates to methods and apparatus for conditioning grain flows by adding liquid directly to the grain flow. Those having ordinary skill in the art are workers in the grain industry who are responsible for conditioning grain.

(2) Description of the Related Art (Including Information Disclosed Pursuant to 37 CFR §§ 1.97-1.99)

It is commonly known within the feed grain industry that the nutritional value of grains to be fed to livestock is potentiated at different moisture levels. Feed grains are typically held in storage prior to being dispensed for either further processing or ultimate end use. During storage, the moisture content of the grain can widely fluctuate. Before further processing or end use, the grain is typically tested for present moisture content and then conditioned to bring that grains' moisture content to a desired level.

Once the optimum moisture content is determined for a specific batch of grain, a continuous flow of the grain will be initiated and liquid will be sprayed directly upon the grain to increase the moisture level.

In past methods used for conditioning the grain, the moisture content of the grain to be conditioned is obtained and that content is compared to the desired level of moisture. The difference in moisture is then dispensed onto the grain. The moisture content, after the addition of liquid, is not checked or monitored because equipment capable of measuring moisture levels of freshly wetted grain were prohibitively expensive and often applicable only to batch monitoring and not continuous flow.

The following United States Patents are known to applicant and are disclosed because they may be considered material by Examiner. Those patents are:

| U.S. Pat. No. | Issue Date | Applicant |
|---|---|---|
| 4,993,316 | Feb. 19, 1991 | GREER |
| 4,898,092 | Feb. 06, 1990 | GREER |
| 4,742,463 | May 03, 1988 | VOLK, JR. |
| 4,721,448 | Jan. 26, 1988 | IRISH, ET AL. |
| 4,499,111 | Feb. 12, 1985 | OETIKER, ET AL. |
| 3,932,736 | Jan. 13, 1976 | ZAROW, ET AL. |

Both GREER patents disclose grain conditioning apparatus that employ a moisture sensing device together with a continuous flow of grain. In each, the positioning of the sensor is restricted to being upstream of the moisture application. Therefore, the grain is not freshly wetted when it passes the sensing device. Instead, the moisture is detected by the sensor and then the grain is passed under a moisture applicator before said grain is transported beyond the conditioning apparatus.

VOLK shows a method and apparatus for a pellet mill controller with dye temperature control. A moisture meter is employed in the pelletization process in a cooling section of the apparatus that is placed after moisturization and pelletization. While not explicitly stated, it can be inferred that the pellets have a moisture content but are not freshly wetted.

IRISH discloses a pelletizer with moisture control sensor. Like VOLK, IRISH detects the moisture content of pellets after they have been produced. Once again, it is not explicitly stated that the pellets are not wet when the moisture content is read, but it can be inferentially assumed since the pellets emerge from the pelletizing process in which they are formed and are introduced into a cool-air shaker before being periodically sampled for moisture content. Liquid, however, has been previously added to the pellets in the form of a syrup. Moisture in the form of steam is also injected during the pelletization process. The moisture content of the pellets is measured by an infra-red moisture analyzer. Because the components of the pellets are thoroughly mixed in the pelletization process and the moisture additive is in the form of steam, it may be assumed that the pellets upon exiting the mixer conditioner are not wetted upon their surface.

OETIKER discloses a process for continuously determining the moisture content of spoilable grain products. OETIKER includes the well known method of measuring moisture content through the use of a capacitor. The measurement of the moisture content is made prior to either wetting or drying of the grain. It is specifically stated that measuring processes with microwaves, gamma-rays, and the like are not being considered due to the risks inherent in the rays.

ZAROW discloses an automatic pellet producing system. Like the other pellet making processes and apparatus previously discussed, it appears from the process disclosed that the pellets are not wetted when their moisture content is measured. A means for assuring that liquid water is not introduced together with the steam is also described.

SUMMARY OF THE INVENTION (1) Progressive Contribution to the Art

This invention provides a method and structure for accurately and automatically controlling the moisture content of a grain flow. It is known that specific moisture levels in grains and accurate control of those moisture levels make grain more suitable for its intended use. For example, grain to be used for animal feed usually has a maximum nutritional value at a specific moisture level.

In the present invention, liquid conditioner is added to a primary grain flow at a wetting portion. A sample grain flow is then diverted into a moisture sensing portion, where the total moisture content of the wetted grain is measured by a moisture sensor. An electronic information processor uses moisture content data obtained from the sensor to control the amount of liquid conditioner added to the grain flow and thereby the moisture content of the conditioned grain.

An advantage of this invention is that the moisture content of the grain is measured after the grain is wetted, not before. It is known that variables such as water pressure and evaporation rates affect the wetting process. Therefore, measuring the total moisture content after the grain is wetted allows the total moisture content of the conditioned grain to be accurately controlled.

Measuring the total moisture content after the liquid conditioner is applied also acts as a checking feature on the wetting process. By measuring the moisture content of the grain after it has been wetted, deviations from the desired moisture level are detectable and appropriate adjustment may be made to the amount of liquid being added.

In one embodiment of the invention, a moisture sensing probe is surrounded by a column of grain having a constant height and therefore the column of grain exerts a substantially constant pressure on said probe. Maintenance of a uniform column of grain assures accurate and consistent sensing of moisture content.

A sample tube is provide in one embodiment for sampling a portion of the primary grain flow for moisture content. The sensor probe is housed within a sensor housing that is installed as a section of the sample tube. As such, the sensor housing is easily removed for inspection and maintenance. This provides savings in both time and money. Still further, by having a portion of the primary grain flow diverted for moisture measurement, the measurement is made within seconds after the liquid conditioner has been added to the grain.

The fact that the total moisture content measuring process is continuous and automatic contributes to the invention's high degree of accuracy and responsiveness when correcting for deviations from the desired grain moisture levels. It also eliminates the need for an attendant.

An additional benefit of this invention is its adaptability to existing systems already being used to condition grain flows without requiring extensive modification to that existing system.

(2) Objects of this Invention

An object of this invention is to provide an apparatus and method by which the moisture content of a grain flow may be accurately measured and adjusted so as to potentiate the nutritional value of the grain.

Another object of this invention is to provide a method and apparatus for conditioning a flow of feed grain in which the level of moisture present in the grain is monitored after liquid conditioners have been added to the grain and while said grain is still wet.

Further objects are to achieve the above with devices that are sturdy, durable, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people for implementation.

The specific nature of the invention, as well as other objects, uses, and advantages thereof, will clearly appear from the following description and from the accompanying drawings, the different views of which are not necessarily scale drawings.

As an aid to correlating the terms of the claims to the exemplary drawings, the following catalog of elements and steps is provided:

| | |
|---|---|
| 02 | grain conditioning structure |
| 04 | grain source |
| 05 | grain track |
| 06 | grain elevator |
| 08 | primary grain flow |
| 10 | sample grain |
| 12 | sample grain flow |
| 14 | wetted grain flow |
| 16 | liquid conditioner |
| 18 | grain transfer portion |
| 20 | grain wetting portion |
| 22 | liquid applicator head |
| 24 | down spout |
| 26 | baffling portion |
| 28 | auger twists |
| 30 | sample diversion portion |
| 32 | sample tube |
| 34 | fluid deflecting means |
| 36 | sample tube upper lip |
| 38 | upper sample tube |
| 40 | sample tube entrance |
| 42 | lower sample tube |
| 44 | sample tube exit |
| 46 | moisture sensing portion |
| 48 | moisture sensor |
| 50 | sensor housing |
| 52 | sensor probe |
| 54 | sensor plate |
| 56 | sample tube-return tube juncture |
| 58 | return tube |
| 60 | return conveyance means |
| 62 | return auger |
| 66 | return auger drive shaft |
| 68 | return auger sheaves |
| 70 | return auger motor |
| 72 | motor-auger interconnection |
| 74 | return tube exit |
| 76 | dead box |
| 78 | dead box exit |
| 80 | grain conveyance means |
| 82 | translating meter |
| 84 | sensor-meter electrical interconnection |
| 86 | meter-processor electrical interconnection |
| 88 | electronic information processor |
| 89 | touch pad |
| 90 | Proportional Integral Derivative Process Controller (PID) |
| 91 | read out screen |
| 92 | remotely actuatable valve |
| 94 | processor-valve electrical interconnection |
| 96 | valve liquid inlet |
| 98 | valve liquid exit |
| 100 | valve-applicator interconnecting conduit |
| 102 | liquid conditioner source |

DESCRIPTION OF THE PREFERRED EMBODIMENTS

Structure

Figures 1, 2:
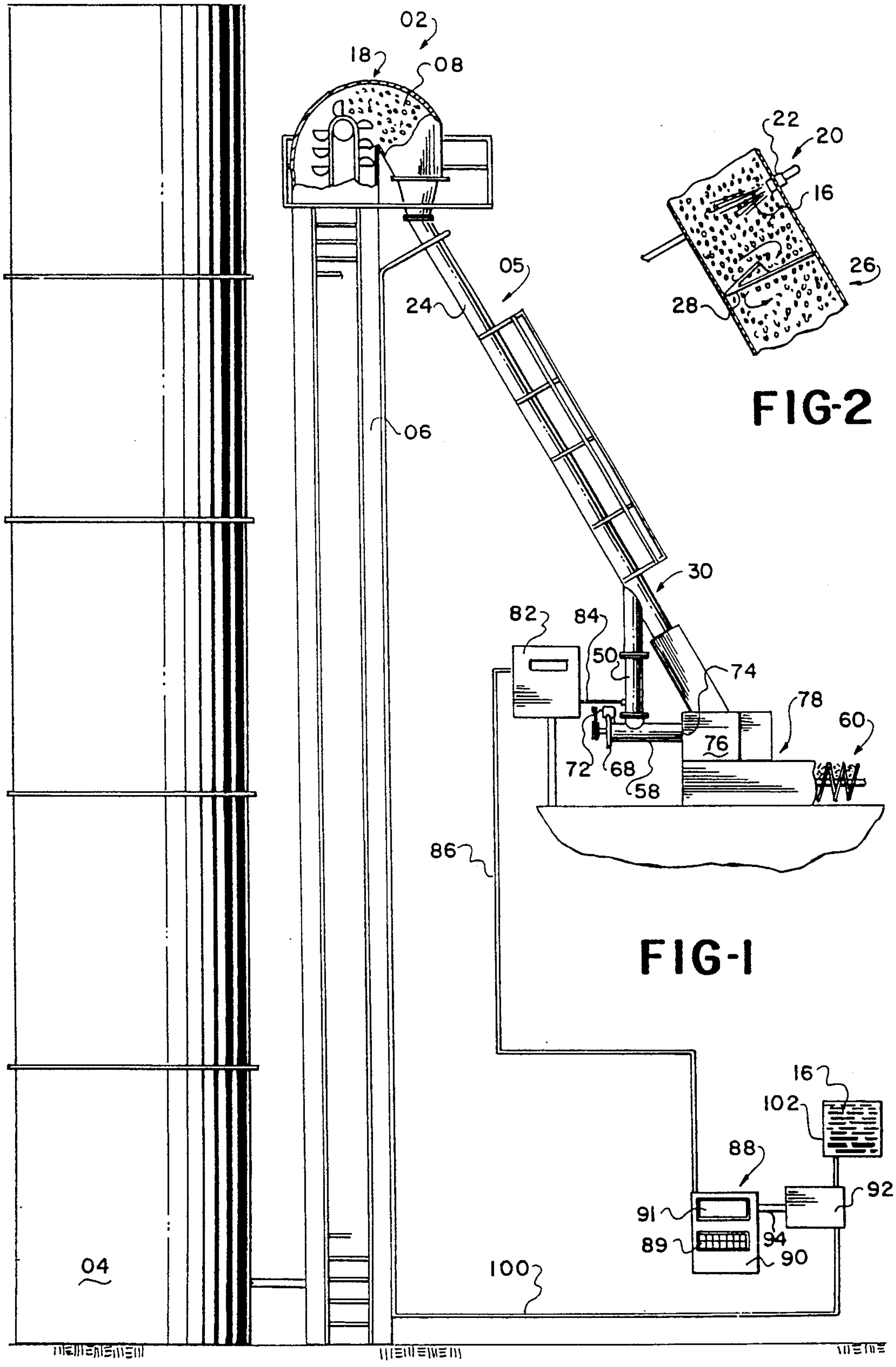
FIG. 1 is an elevational view of the grain conditioning structure.
FIG. 2 is an axial section of the down spout at the grain wetting portion.
Figure 3:
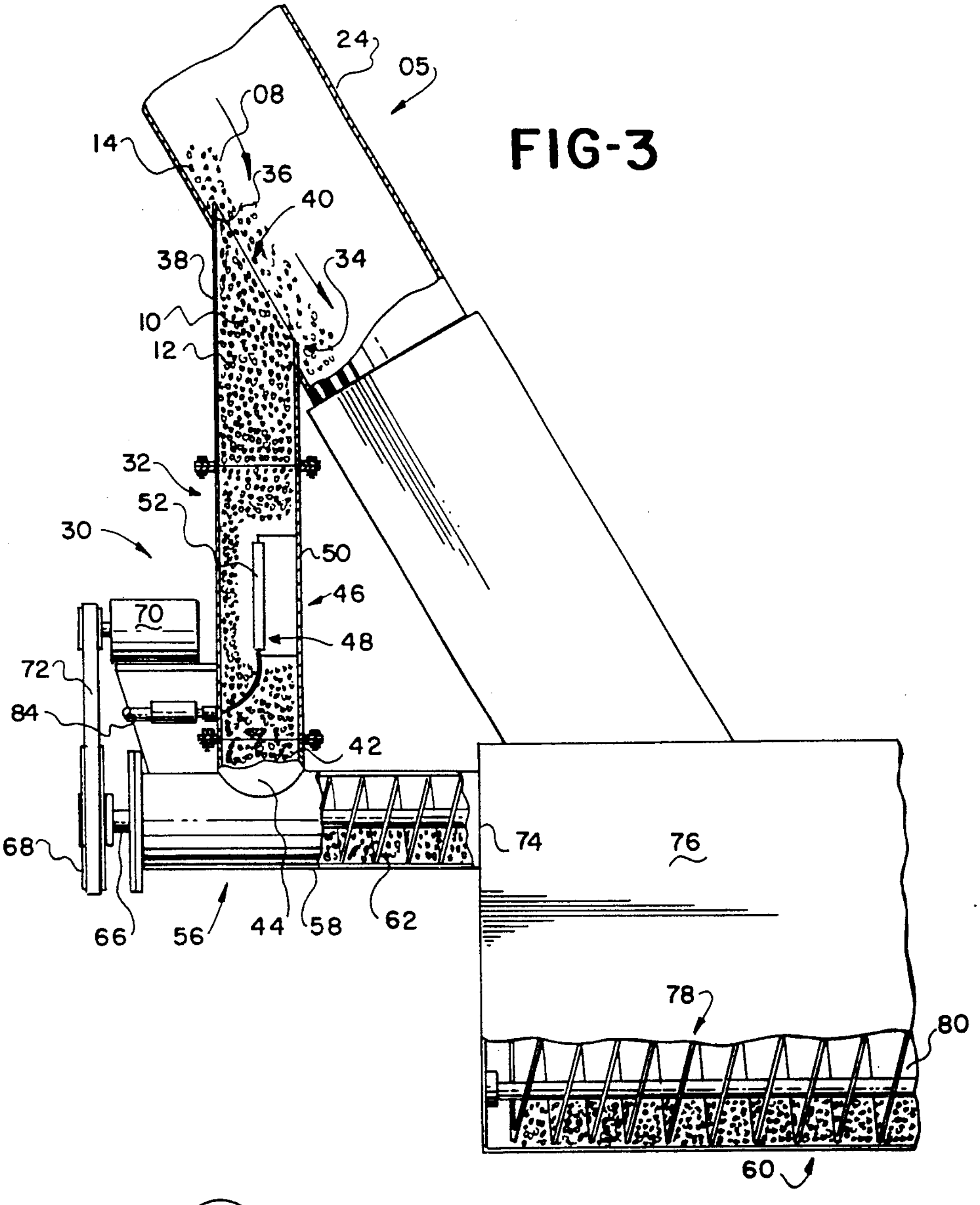
FIG. 3 is a cut-away view of the sample tube, return tube, and down spout.

FIG. 1 shows a grain conditioning structure 02 having a grain track 05 that creates a grain path for a substantially continuous primary grain flow 08. In that the grain flow 08 moves along the path, it is said that the flow is moving from an upstream direction in a downstream direction. The track 05 comprises a down spout 24 into which grain is dispensed from a grain source 04. In the embodiment shown in FIG. 1, a grain elevator 06 transfers grain from the grain source 04 to the down spout 24 within a grain transfer portion 18. For example, it is contemplated that the grain source 04 may be a holding tank, a rail car or a trailer containing grain.

A liquid applicator head 22 is located within a grain wetting portion 20 of the down spout 24 in the embodiment of FIG. 1. The wetting portion 20 is located downstream from a point where the grain flow 08 is introduced into the grain track 05. Liquid conditioner 16 is dispensed or sprayed upon the primary grain flow 08 in the wetting portion 20 of the down spout 24 thereby creating a wetted grain flow 14.

A baffling portion 26 of the down spout 24 is located downstream of the wetting portion 20. The baffling portion 26 disturbs the grain flow 08 as said grain flow 08 moves down the down spout 24 thereby mixing the freshly wetted grain inside the down spout 24 by agitation.

A moisture sensor 48 is positioned downstream from the grain wetting portion 20 in a moisture sensing portion 46. The moisture sensor 48 is electrically connected to a translating meter 82 by sensor-meter electrical interconnection 84. The meter 82 is also electrically connected to an electronic information processor 88 by meter-processor electrical interconnection 86. The processor is further electrically connected to a remotely actuatable valve 92 by processor-valve electrical interconnection 94.

The valve 92 is interconnected between a liquid conditioner source 102 and the applicator head 22 for regulating the amount of liquid conditioner 16 supplied to head 22. A tubular conduit running from the source 102 is connected to the valve 92 at a valve liquid inlet 96 and a valve-applicator interconnecting conduit 100 is connected t said valve 92 at a valve liquid exit 98.

It is contemplated that the applicator head 22 may be in any form that is capable of effectively spraying the liquid conditioner 16 upon the grain flow 08 as said grain flow 08 passes through the grain wetting portion 20. In the embodiment illustrated in FIG. 1, the valve-applicator interconnecting conduit 100 runs from the valve 92 to the head 22 along the length of the elevator 06.

FIG. 2 shows auger twists 28 in the baffling portion 26 of an upper portion of the down spout 24. It is contemplated that one or more twists may be employed in consecutive placement within the down spout 24. In the embodiment shown, the twists 28 are constructed from portions of an auger; each twist 26 being less than 360 degrees of auger thread.

In the embodiment of FIG. 1, a sensor probe 52 of the moisture sensor 48 is contained within a sample diversion portion 30. The sample diversion portion 30 acts as a bypass conduit for a sample grain flow 12 out of, and then back into the down spout 24. The moisture sensor 48 measures a total moisture content of the grain flow 08 by quantifying the amount of moisture absorbed in and absorbed on the surface of the grain flow 08.

The moisture probe 52 is contained within a sensor housing 50. The sensor housing 50 forms part of the sample tube 32 into which the sample grain flow 12, said sample flow 12 being made up of sample grain 10, is diverted out of the primary grain flow 08. The sensor housing 50 is positioned between an upper sample tube 38 and a lower sample tube 42. A sample tube entrance 40 is located at an end of the upper sample tube 38 away from the sensor housing 50 and a sample tube exit 44 is located at an end of the lower sample tube 42 away from the sensor housing 50. The upper sample tube 38, the sensor housing 50, and the lower sample tube 42 are connected end-to-end so as to form a continuous conduit that is the sample tube 32 through which the sample grain flow 12 is directed. It is preferred that the connections between the sensor housing 50 and the other sections of the sample tube 38 be by bolted flanges that facilitate installment and removal of the housing 50. The sample tube 32 has a uniform inner diameter along said tube's 32 length.

The sample tube 32 is open to an interior of the down spout 24 at the sample tube entrance 40. The orientation of the sample tube 32 to the down spout 24 is such that centerlines of each intersect. The upper sample tube 38 extends through a lower surface of the down spout 24 and into the interior of the down spout 24 for a short distance. A portion of the upper sample tube 38 that extends into the spout 24 is referred to as a sample tube upper lip 36. The lip 36 creates a fluid deflecting means 34 about the sample tube entrance 40 within the spout 24.

The lower sample tube 42 is connected to a return tube 58 at the sample tube exit 44. The connection forms a sample tube-return tube juncture 56 that provides fluid communication between the sample tube 32 and the return tube 58. A return tube exit 74 provides an opening into the down spout 24 at a location downstream from the sample tube entrance 40.

Inside the return tube 58 is a return conveyance means 60. In the preferred embodiment, said conveyance means 60 is a return auger 62 that propels sample grain 10 through the tube 58 from the sample tube exit 44 back to the primary grain flow 08 in the down spout 24, or alternatively into a dead box 76.

A driven end of a return auger drive shaft 66 extends beyond a closed end of the return tube 58. The drive shaft 66 is connected to an auger screw at an end of said shaft 66 opposite the driven end. A return auger sheave 68 is mounted on the driven end of the drive shaft 66. The return auger sheave 68 is powered by a return auger motor 70. It is contemplated that the return auger sheave 68 may comprise an expanding pulley that provides means for driving the return auger at variable speeds. In the preferred embodiment, a motor-auger interconnection 72 is a reinforced rubberized belt, commonly referred to as a fan belt. The interconnection 72 spans the distance between the motor 70 and the sheave 68, and imparts rotation from said motor 70 to the drive shaft 66.

In the preferred embodiment, the return tube exit 74 opens into the dead box 76. The dead box 76 is located at an extreme end of the down spout 24 opposite the grain wetting portion 20 of said spout 24. The box 76 is merely an enlargement upon the spout 24 that acts as a reservoir for the wetted grain flow 14. A grain conveyance means 80 is provided to evacuate retained grain out of the dead box 76 through a dead box exit 78. The grain conveyance means 80 continues transporting the conditioned grain beyond the conditioning structure. In the preferred embodiment, the conveyance means 80 is an auger.

The sensor probe 52 is positioned within the sensor housing 50 so that a longitudinal axis of the probe 52 is parallel to the centerline of the sample tube 32. The probe's 52 position is fixed by said probe's 52 attachment to an interior wall of the sensor housing 50. The attachment is at one end of the probe 52 and an opposite end of the probe 52 points into the sample grain flow 12. Moisture Register Products, a division of Aqua Measure Instrument located in Pomona, California produces moisture sensors 48 that are suitable for utilization in this invention. Copies of two flyers describing and promoting Moisture Register Product's moisture probes are attached hereto as Attachment "A" and the information contained therein is incorporated herein by reference. One of the flyers is entitled MOISTURE DISPLAY SYSTEM MDS 1 and the other is entitled RADIO FREQUENCY MOISTURE PROBE CONTINUOUS ON-LINE OR BATCH ANALYSIS.

A preferred sensor 48, the MDS 1, produced by Moisture Register Products uses a radio frequency power loss technique operating at 2 megahertz to detect the total moisture present in a sample of grain located about said sensor 48. The sensor 48 projects a radio frequency field into the grain sample and measures the loss or change in radio frequency dielectric constant as affected by moisture. A first electrical signal is generated by the sensor 48 which is representative of the change in radio frequency dielectric constant, which is directly related to the moisture content of the grain.

In some sensor probes 52, an output of said sensor probe 52 is an analog signal which is transmitted through the sensor-translating meter electrical interconnection 84 to the translating meter 82 where said analog signal is converted.

Figure 4:
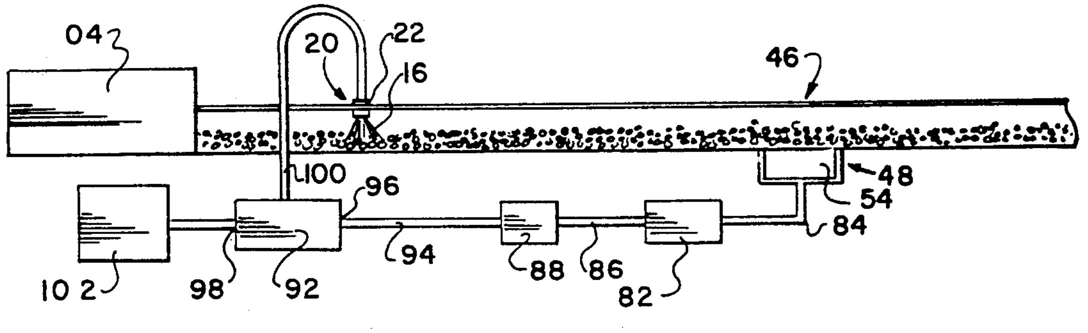
FIG. 4 is a schematic drawing of an alternative embodiment in which a sensor plate is used to measure the moisture content of the grain flow.

In an alternative embodiment shown in the schematic of FIG. 4., a sensor plate 54 is positioned below the grain flow 08 and said flow 08 is directed over the plate 54 thereby causing grain-to-plate contact as the flow 08 slides over the plate 54. The plate 54 is capable of measuring the total moisture content of the grain passing over said plate 54. A commercially available plate 54 is produced by The Alkon Corporation of Columbus, Ohio. A copy of a flyer entitled HYDRONIX 8100 CONTINUOUS ON-LINE MOISTURE MONITORING SYSTEM is attached hereto as Attachment "B"; the information contained therein is incorporated herein by reference. That flyer describes and shows the 8100 Probe that is considered suitable for this application and has been utilized in the present invention.

In the preferred embodiment shown in FIG. 1, the sensor-meter electrical interconnection 84 connects to the probe 52 near the end of said probe 52 that is attached to the wall of the sensor housing 50. The interconnection 84 passes from the probe 52 through a wall of the housing 50 and connects at an opposite end of said interconnection 84 to the translating meter 82. A typical example of the meter 82 is described and shown in Attachment "B" as The Digital Display unit that processes the first electrical signal and displays a corresponding moisture content on an LED readout. A typical example of the sensor-meter electrical interconnection 84 is also described and shown in Attachment "B" as a 5 ft. captive cable equipped with 6-pin waterproof connector. In the preferred embodiment, the interconnection 84 is contained within a flexible tube that protects said interconnection 84.

As previously described, the total percentage grain moisture content is transmitted from the translating meter 82 to the electronic information processor 88 via the meter-processor electrical interconnection 86. In the preferred embodiment of the invention, the electronic information processor is a Proportional Integral Derivative Process Controller (PID). The PID has means through which an operator is able to key in a desired moisture level to be imparted in the grain flow 08 being conditioned. In the preferred embodiment, the means for keying in the desired moisture level is a touch pad 89. The PID also has a read out screen where different types of information may be displayed. It is contemplated that the actual moisture content of the grain 10 that is measured by the moisture sensor 48 may be displayed simultaneously with the desired percentage moisture content that has been keyed in by an operator. It is also contemplated that other information may be displayed such as the volumetric output of liquid conditioner 16 being allowed to pass through the valve 92. The display of the processor 88 is typically controlled from the touch pad 89. As a minimum, the processor 88 must have the capability to compare the desired moisture level with the actual moisture level detected by the moisture sensor 48. From the difference between the two moisture levels, that is the desired and actual, the PID determines the amount of liquid conditioner 16 that needs to be applied to the grain flow 08 to achieve the desired moisture level in the grain. The amount needed is translated into a setting for the remotely actuatable valve 92 that will cause the appropriate amount of liquid conditioner 16 to be dispensed upon the grain flow 08 from applicator head 22. The setting for the valve 92 is transmitted from the PID to the valve 92 on the processor-valve electrical interconnection 94. It is contemplated that the opening and closing of the valve 92 will be affected by an electrically powered motor that is controlled by the processor 88.

Processors capable of performing the aforementioned functions are well known and commercially available. Examples of such processors are manufactured by the Honeywell Corporation. Information about Honeywell's Digital Controllers and Digital Programmers suitable for use in the present invention are disclosed in pages 2 through 18 of Honeywell's condensed catalog of INDUSTRIAL AUTOMATION AND CONTROL INSTRUMENTATION, attached hereto as Attachment "C", said information being incorporated by reference.

One valve 92 that is suitable for inclusion in the present invention is manufactured by Neles-Jamesbury, Inc., and is described in a specifications manual entitled BULLETIN A120-2; said specifications manual being attached hereto as Attachment "D" and the information contained therein incorporated herein by reference.

Method

Grain is removed out of and transported from the grain source 04 and supplied to the grain track 05. In the preferred embodiment, that transportation is accomplished by grain elevator 06. The grain is dispensed into the track 05 near a top end of the spout 24 thereby creating a substantially constant primary grain flow 08 that is allowed to cascade down said track 05. The grain flow is directed down the spout 24 so that said grain flow passes by the liquid applicator head 22. As the grain flow 08 passes by the head 22, liquid conditioner 16 is sprayed upon the grain flow 08 from the applicator head 22 thereby wetting said grain flow 08. A wetted grain flow 14 results that is directed beyond the applicator 22 and down the spout 24 as a result of gravity, as well as the force imparted on the grain from the elevator 06 as said grain was dispensed into the track 05.

After the now wetted grain flow 14 moves beyond the grain wetting portion 20 of the spout, the grain flow 14 encounters the baffling portion 26 that disturbs the flow and causes mixing. In the preferred embodiment, the grain enters one or more twists 28 created from threaded sections of an auger.

A majority of the wetted grain flow 14 continues down a length of the spout 24 finally coming to rest inside the dead box 76 located at a lower end of the spout 24. Out of the primary grain flow 08, the sample grain flow 12 is diverted down stream from the baffling portion 26. As the primary grain flow moves past the point were the sample tube upper lip 36 protrudes into the spout 24, an amount of sample grain 10 falls into the sample tube 32. In the event that free liquid is running down the spout 24, the lip prevents that liquid from running into the sample tube 32.

The amount of grain 10 that enters the sample tube 32 is sufficient to maintain the tube 32 completely full. A column of grain is thereby created within the filled sample tube 32. Because of the grain removal action of the return auger out of the sample tube 32, the column of sample grain 10 is caused to move downward through the tube 32. The rate at which the sample grain 10 moves through the tube 23 is controlled by limiting the rate at which said grain 10 is allowed to exit the sample tube 32 with the return conveyance means 60. As the grain 10 moves down the tube 32, a sample of wetted grain flow is caused to pass about the probe 52 located within the sensor housing 50 portion of the tube 32. The probe 52 constantly reads the actual total moisture absorbed within and adsorbed on the sample grain located immediately about said probe 52. The reading includes moisture that is adsorbed within the grain, as well as moisture adsorbed upon the surface of the grain. Once the sample grain flow 12 has passed the probe 52, the grain is emptied into the return tube 58 through the sample tube exit 44. The grain is then augured through the return tube 58 back to the wetted grain flow 14 as said flow 14 is still cascading down the spout 24 or into the dead box 76 where the wetted grain is being reservoired. From the dead box 76, the wetted grain is transported beyond the conditioning structure 02 by grain conveyance means 80 through a dead box exit 78.

The moisture reading obtained by the probe 52 produces a first electrical signal that is representative of the total moisture content detected from the grain flow 14. The first signal is transmitted over the sensor-meter electrical interconnection 84 to translating meter 82. The first electrical signal is converted into a second electrical signal that is likewise representative of the total moisture absorbed in and adsorbed on the grain. The percentage moisture may be displayed at the meter B2 on a readout. The second signal is transmitted from the meter 82 to the electronic information processor 88 on the meter processor electrical interconnection 86.

An operator has previously keyed into the processor 88 a percentage of desired total moisture absorbed in and adsorbed on the grain flow 14. The actual total moisture reading is compared to the desired reading by the processor 88 and a difference is computed. The processor 88, from the difference computed from the actual and desired moisture levels, determines an amount of liquid conditioner 16 that needs to be added to the grain flow to adjust the actual moisture level in the wetted grain flow 14 to the desired moisture level. The processor then converts this needed amount into a setting for the remotely actuatable valve 92. The setting is then transmitted to the valve 9 from the processor and adjustments are made to the openness of the valve 92 by either opening or closing of the valve, based on whether more or less liquid is need to achieve the desired moisture level. This alters a volumetric rate at which liquid conditioner 16 is supplied to the applicator head 22 thereby causing a proper amount of liquid conditioner 16 to be applied to the grain flow to obtain the desired moisture reading in subsequently wetted grain.

Liquid conditioner 16 flowing from the conditioner source 102 is directed through the valve and respective conduits to the head 22. The conditioner is then dispensed upon the grain and the monitoring and adjusting process is repeated continuously while a grain flow 08 is being conditioned.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim:

1. A method for conditioning grains, comprising the following steps:

a. supplying a primary grain flow to a liquid applicator head;

b. directing the grain flow so that said grain flow passes by the liquid applicator;

c. applying a liquid conditioner to the grain flow from said applicator and thereby wetting said grain flow to produce a wetted grain flow;

d. directing the wetted grain flow beyond the applicator head;

e. passing a sample of the wetted grain flow by a moisture sensor;

f. measuring the total moisture absorbed within and adsorbed on the grain;

g. transmitting a total moisture reading obtained at the sensor to an electronic information processor;

h. computing a difference between the total moisture reading of the wetted grain from a desired moisture reading;

j. making adjustments to a remotely actuatable valve with the electronic information processor based on the computed difference by opening and closing said valve and thereby k. altering a volumetric rate of the liquid conditioner being supplied to the applicator head and thereby l. causing a proper amount of liquid conditioner to be applied to the grain flow to obtain the desired moisture reading in subsequently wetted grain.

2. The method for conditioning grains as recited in claim -1- further comprising:

m. removing grain from a grain source;

n. transferring the grain from the grain source to a grain track;

o. dispensing the grain upon the grain track at a point ahead of the applicator head;

p. creating the grain flow within the track with the dispensed grain;

q. causing the grain flow to pass by the applicator head; and r. spraying liquid conditioner out of the applicator head directly upon the grain flow to produce the wetted grain flow as the primary grain flow passes by the applicator.

3. The method for conditioning grains as recited in claim -1- further comprising:

m. causing the sample grain flow to slide over a sensor plate thereby resulting in plate-to-grain contact.

4. The method for conditioning grains as recited in claim -1 - further comprising:

m diverting the sample grain flow out of the primary grain flow into a sample tube within which a sensor probe is positioned;

n. creating a column of sample grain within the vertical sample tube;

o. causing the sample grain of the column to pass about the sensor probe while maintaining the column at a substantially constant height above the probe inside the sample tube and thereby p. maintaining a substantially constant pressure of grain against the probe by q. assuring that a greater portion of the primary grain flow is available for diversion into the sample tube than is required to keep the sample tube filled.

5. The method for conditioning grains as recited in claim -4- further comprising:

r. directing the sample grain flow past the probe at a substantially constant flow rate;

s. allowing grain-to-probe contact as the sample grain flows past the probe; and t. allowing the sample grain flow to exit the sample tube and enter into a return tube that conveys said sample grain flow back into the primary grain flow.

6. The method for conditioning grains as recited in claim -5- further comprising:

u. controlling the rate at which the sample grain flow passes the sensor probe by v. limiting the rate at which sample grain is allowed to exit the sample tube with a return conveyance means located within the return tube.

7. The method for conditioning grains as recited in claim -1- further comprising:

m. passing the sample grain flow about a sensor probe so that there is probe-to-grain contact;

n. emitting a radio frequency from the probe as the sample grain flow moves past the probe; and o. measuring a power loss of the emitted radio frequency.

8. The method for conditioning grains as recited in claim -7- further comprising:

p. producing a first electrical signal at the probe that represents the total moisture present in and adsorbed on the grain as detected by the sensor;

q. transmitting the first electrical signal on a sensor-meter electrical interconnection to a translating meter that converts said first electrical signal into a second electrical signal that is likewise representative of the total moisture present in and adsorbed on the grain; and r. transmitting the second electrical signal from the translating meter to the electronic information processor on a meter-processor electrical interconnection.

9. The method for conditioning grains as recited in claim -8- further comprising:

s. receiving the second electrical signal at the electronic information processor;

t. converting the second signal into an actual moisture reading that may be compared to a desired moisture reading by the electronic information processor, said desired moisture reading having been input into the electronic information processor by an operator; and u. using the electronic information processor to compare the two readings and to obtain a difference between the two readings.

10. The method for conditioning grains as recited in claim -9- further comprising:

v. translating the difference between the two readings with the electronic information processor into a third electrical signal;

w. transmitting the third electrical signal from the electronic information processor to the remotely actuatable valve on a processor-valve electrical interconnection;

x. opening the valve an appropriate amount to effect the desired moisture reading in the wetted grain flow when the difference between the actual moisture reading from the desired moisture reading is positive; and y. closing the valve an appropriate amount to effect the desired moisture reading in the wetted grain flow when the difference between the actual moisture reading from the desired moisture reading is negative.

11. A method for creating a sample grain flow from a primary grain flow comprising the following steps:

a. diverting the sample grain flow out of the primary grain flow into a sample tube within which a sensor probe is positioned;

b. creating a column of sample grain within the vertical sample tube;

c. causing the sample grain of the column to pass about the sensor probe while maintaining the column at a substantially constant height above the probe inside the sample tube and thereby d. maintaining a substantially constant pressure of grain against the probe by e. assuring that a greater portion of the primary grain flow is available for diversion into the sample tube than is required to keep the sample tube filled.

12. The method for conditioning grains as recited in claim -11- further comprising:

f. directing the sample grain flow past the probe at a substantially çonstant flow rate;

g. allowing grain-to-probe contact as the sample grain flows past the probe; and h. allowing the sample grain flow to exit the sample tube and enter into a return tube that conveys said sample grain flow back into the primary grain flow.

13. The method for conditioning grains as recited in claim -12 further comprising:

j. controlling the rate at which the sample grain flow passes the sensor probe by k. limiting the rate at which sample grain is allowed to exit the sample tube with a return conveyance means located within the return tube.

14. A structure for conditioning grains, comprising:

a. a grain track for confining a flow of grain;

b. a grain source from which grain is supplied to the track and dispensed into said track so that a primary grain flow is created within said track;

c. a liquid applicator head oriented for dispensing liquid conditioner upon the grain flow as the grain flow passes by said applicator head;

d. a moisture sensor positioned down stream from the liquid applicator and within a portion of the grain flow;

e. an electronic information processor connected to the moisture sensor, said processor being capable of receiving and interpreting the information provided by the sensor concerning total moisture in and adsorbed on the grain; and f. a remotely actuatable valve that is controlled by the electronic information processor, said valve governing the amount of liquid conditioner supplied to the applicator head for dispensation onto the grain flow.

15. A structure for conditioning grains as recited in claim -14- further comprising;

g. the grain track having a down spout in which the primary grain flow is confined during and immediately after said grain flow has been conditioned by dispensed liquid conditioner;

h. a sample tube in fluid communication with the down spout and oriented so that a sample flow of grain will enter the sample tube and be diverted out of the primary grain flow;

j. a sensor probe positioned longitudinally within the sample tube so that the sample grain flow moves past said probe as the sample grain flow passed through the sample tube;

k. a return tube connected to, and in fluid communication with the sample tube so that the sample grain flow passes into said return tube from the sample tube; and l. a return tube exit through which the sample grain flow is returned to the primary grain flow.

16. A structure for conditioning grains as recited in claim -15- further comprising;

m. a return auger is housed within the return tube that controls the rate at which the sample grain is allowed to exit the sample tube.

17. A structure for conditioning grains, comprising;

a. grain track having a down spout in which the primary grain flow is confined during and immediately after said grain flow has been conditioned by dispensed liquid conditioner;

b. a sample tube in fluid communication with the down spout and oriented so that a sample flow of grain will enter the sample tube and be diverted out of the primary grain flow;

c. a sensor probe positioned longitudinally within the sample tube so that the sample grain flow moves past said probe as the sample grain flow passed through the sample tube;

d. a return tube connected to, and in fluid communication with the sample tube so that the sample grain flow passes into said return tube from the sample tube; and e. a return tube exit through which the sample grain flow is returned to the primary grain flow.

* * * * *